United States Patent
Been et al.

(10) Patent No.: US 9,799,234 B2
(45) Date of Patent: Oct. 24, 2017

(54) SHOULDER ASSEMBLY FOR CRASH TEST DUMMY

(71) Applicant: Humanetics Innovative Solutions, Inc., Plymouth, MI (US)

(72) Inventors: Bernard Willem Been, The Hague (NL); Mark John Burleigh, Hemel Hempstead (GB)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 396 days.

(21) Appl. No.: 14/148,927

(22) Filed: Jan. 7, 2014

(65) Prior Publication Data

US 2014/0190280 A1    Jul. 10, 2014

Related U.S. Application Data

(60) Provisional application No. 61/749,646, filed on Jan. 7, 2013.

(51) Int. Cl.
*G09B 23/32*    (2006.01)

(52) U.S. Cl.
CPC .................. *G09B 23/32* (2013.01)

(58) Field of Classification Search
CPC ..................................... G09B 23/32
USPC ............... 434/267, 296, 268; 73/866.4
See application file for complete search history.

(56) References Cited

U.S. PATENT DOCUMENTS

| | | |
|---|---|---|
| 1,385,817 A | 7/1921 | Dilworth |
| 2,349,411 A | 5/1944 | Dorrance |
| 2,449,728 A | 9/1948 | Snethun |
| 2,494,734 A | 1/1950 | Wilkinson |
| 3,491,378 A | 1/1970 | Ioffe et al. |
| 3,557,471 A * | 1/1971 | Payne et al. ........... G09B 23/32 434/270 |
| 3,753,301 A * | 8/1973 | Daniel ................... G09B 23/32 434/267 |
| 3,850,443 A * | 11/1974 | Hassan ................ B60G 7/005 116/208 |
| 4,235,025 A | 11/1980 | Kortge |
| 4,261,113 A | 4/1981 | Alderson |
| 4,276,032 A | 6/1981 | Woley et al. |
| 4,349,339 A | 9/1982 | Daniel |
| 4,488,433 A | 12/1984 | Denton et al. |
| 4,521,924 A | 6/1985 | Jacobsen et al. |
| 4,685,928 A | 8/1987 | Yaeger |

(Continued)

FOREIGN PATENT DOCUMENTS

| | | | |
|---|---|---|---|
| JP | 2012168007 A | * | 9/2012 |
| WO | 98/47122 | | 10/1998 |
| WO | 2009/101200 | | 8/2009 |

OTHER PUBLICATIONS

Machine translation of JP 2012-168007.*

*Primary Examiner* — David M Gray
*Assistant Examiner* — Andrew V Do
(74) *Attorney, Agent, or Firm* — Howard & Howard Attorneys PLLC

(57) ABSTRACT

A shoulder assembly for a crash test dummy includes a shoulder assembly having a spring housing and a shoulder pivot member pivotally connected to the spring housing. The shoulder assembly includes a spring element disposed in the spring housing and an adjustable member to adjust the friction of the spring element.

23 Claims, 14 Drawing Sheets

(56) References Cited

U.S. PATENT DOCUMENTS

| | | |
|---|---|---|
| 4,986,833 A | 1/1991 | Worland |
| 5,741,989 A | 4/1998 | Viano et al. |
| 6,982,409 B2 | 1/2006 | Huang et al. |
| 2005/0066705 A1 | 3/2005 | Choi |

* cited by examiner

SHOULDER ASSEMBLY FOR CRASH TEST DUMMY

CROSS-REFERENCE TO RELATED APPLICATION(S)

The present application claims the priority date of U.S. Provisional Patent Application Ser. No. 61/749,646, filed Jan. 7, 2013.

BACKGROUND OF THE INVENTION

1. Field of the Invention

The present invention relates generally to crash test dummies and, more particularly, to a shoulder assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic test devices, better known as "crash test dummies", to estimate a human's injury risk. The dummy must possess the general mechanical properties, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly, rib cage assembly, abdomen, pelvis assembly, right and left arm assemblies, and right and left leg assemblies. The arm assembly has an upper arm assembly and a lower arm assembly. The upper arm assembly is typically connected to a shoulder assembly, which, in turn, is typically connected to the spine assembly.

The shoulder assembly should be designed to meet the anthropometry requirements for the particular humans of interest. One disadvantage of a current shoulder assembly is that the clavicle does not meet the anthropometric target position of lateral from the mid saggital plane. Another disadvantage of the current shoulder assembly is that it applies left and right soft foam shoulder moldings inside a dedicated jacket and the position and shape of the foam is not well defined and does not provide a repeatable position of and interaction with a restraint belt. Yet another disadvantage of the current shoulder assembly is that it lacks joint friction and sufficient durability. Thus, there is a need in the art for a shoulder assembly that meets anthropometric requirements, has joint friction, and is more durable.

In addition, the current arm assembly of the crash test dummy does not match anthropometry requirements for particular humans of interest. Moreover, the current arm assembly is not well integrated into the shoulder assembly. Thus, there is a need in the art for an upper arm assembly that meets anthropometry requirements and is well integrated into the shoulder assembly for a crash test dummy.

SUMMARY OF THE INVENTION

Accordingly, the present invention is a shoulder assembly for a crash test dummy. The shoulder assembly includes a spring housing and a shoulder pivot member pivotally connected to the spring housing. The shoulder assembly also includes a spring element disposed in the spring housing and an adjustable member to adjust the friction of the spring element.

In addition, the present invention is a crash test dummy including a body and a spine assembly operatively attached to the body. The crash test dummy also includes a shoulder assembly connected to the spine assembly. The shoulder assembly includes a spring housing and a shoulder pivot member pivotally connected to the spring housing. The shoulder assembly also includes a spring element disposed in the spring housing and an adjustable member to adjust the friction of the spring element.

One advantage of the present invention is that a new shoulder assembly is provided for a crash test dummy. Another advantage of the present invention is that the shoulder assembly includes a spherical joint for the clavicle, introduction of adjustable joint friction to obtain a more reproducible dummy seating position, and geometric simplification of components for ease of manufacturing. Yet another advantage of the present invention is that the shoulder assembly includes a clavicle load cell that allows measurement of vertical and interior-posterior loads in both ends of the clavicle. A further advantage of the present invention is that a new upper arm assembly is provided for a crash test dummy. Yet a further advantage of the present invention is that the upper arm assembly has a humerus joint that provides joint friction and increased durability. Still a further advantage of the present invention is that the upper arm assembly is compatible with the shoulder assembly and meets the anthropometric targets. Yet still a further advantage of the present invention is that the upper arm assembly can be used on the left hand and right hand positions of the crash test dummy.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
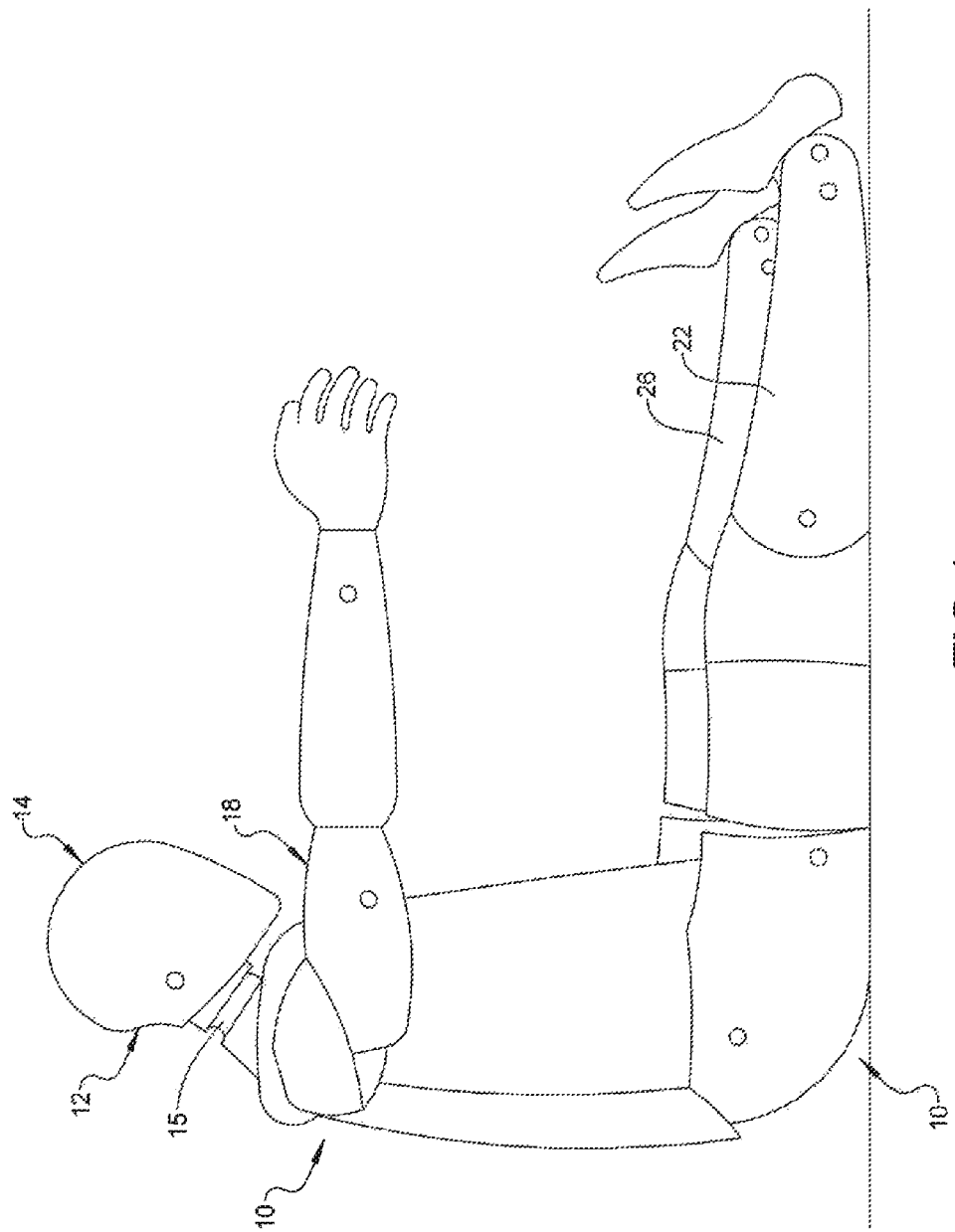
FIG. 1 is a side view of one embodiment of a shoulder and upper arm assembly, according to the present invention, illustrated in operational relationship with a crash test dummy.
Figure 2:
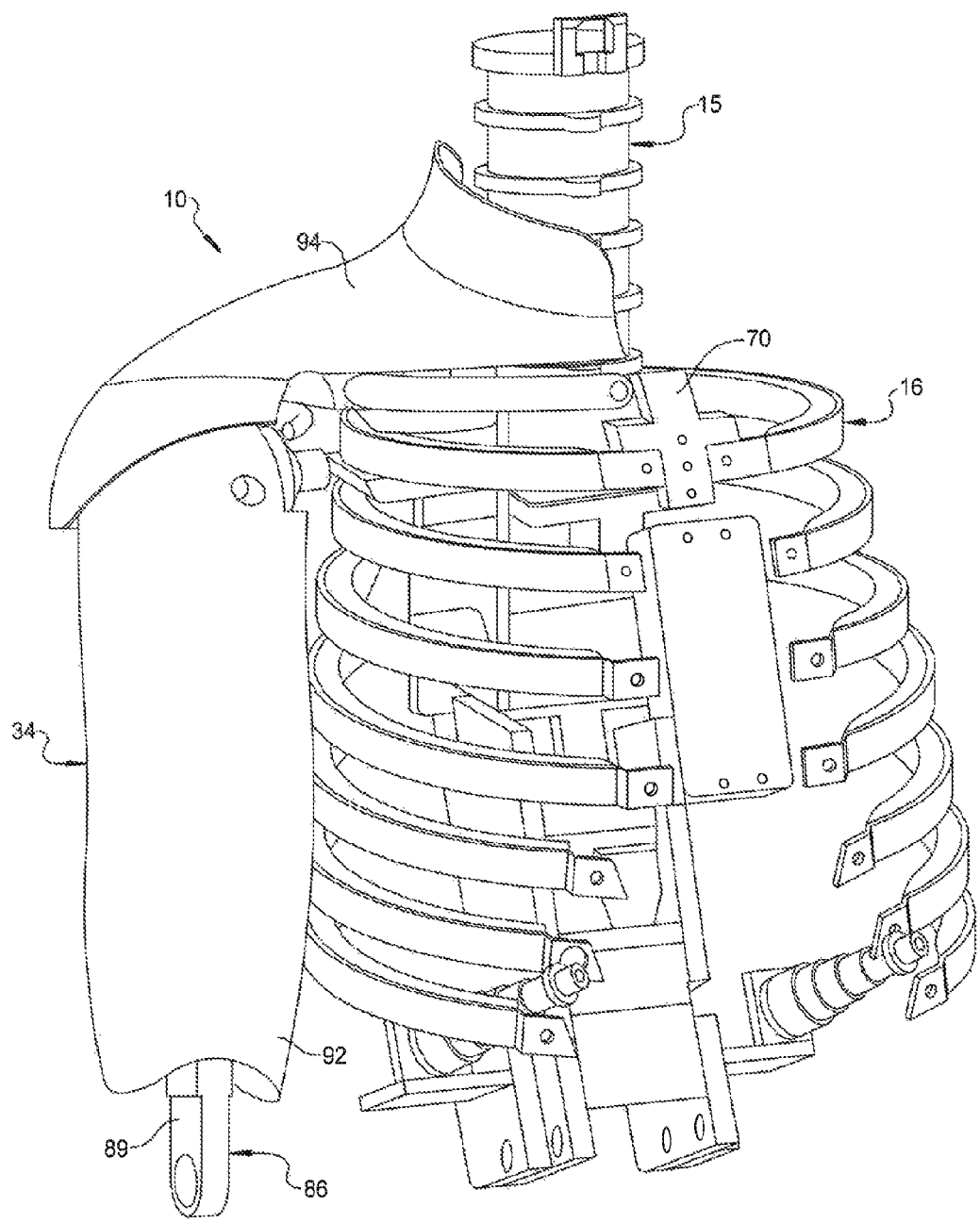
FIG. 2 is a perspective view of the shoulder and upper arm assembly illustrated in operational relationship with a portion of the crash test dummy of FIG. 1.
Figure 3:
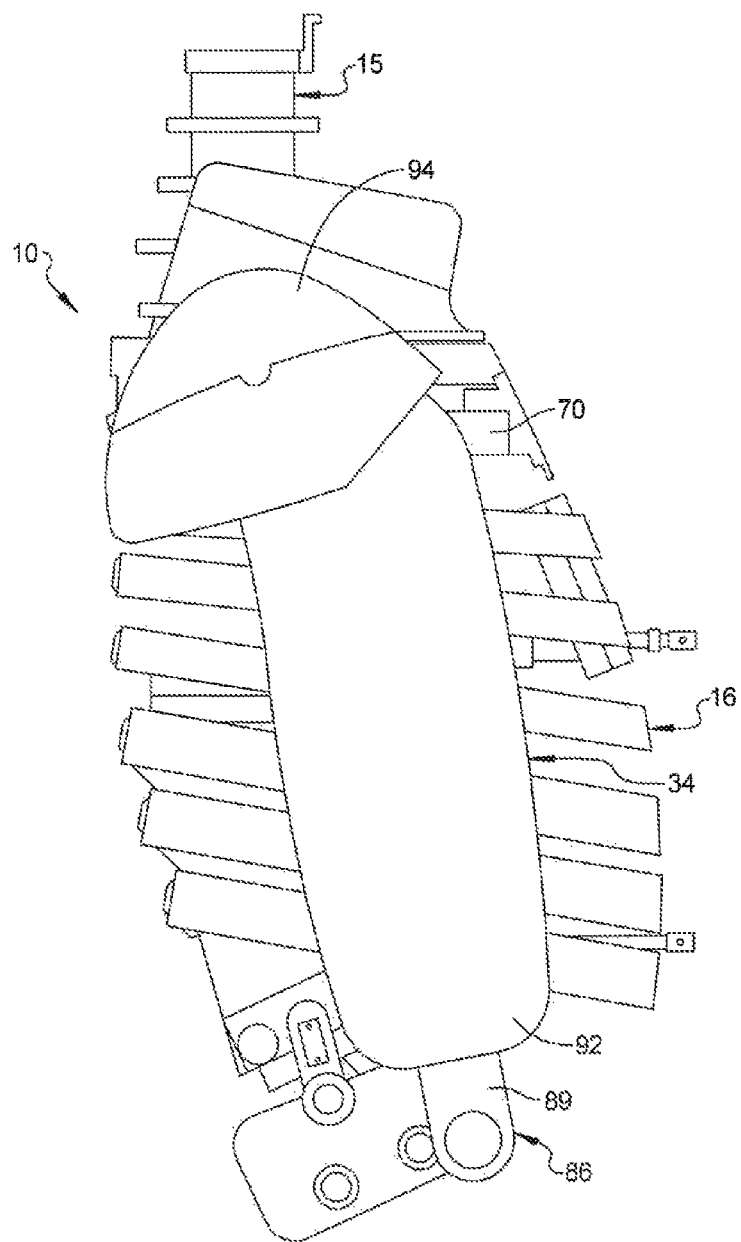
FIG. 3 is a side view of the shoulder and upper arm assembly illustrated in operational relationship with a portion of the crash test dummy of FIG. 1.
Figure 4:
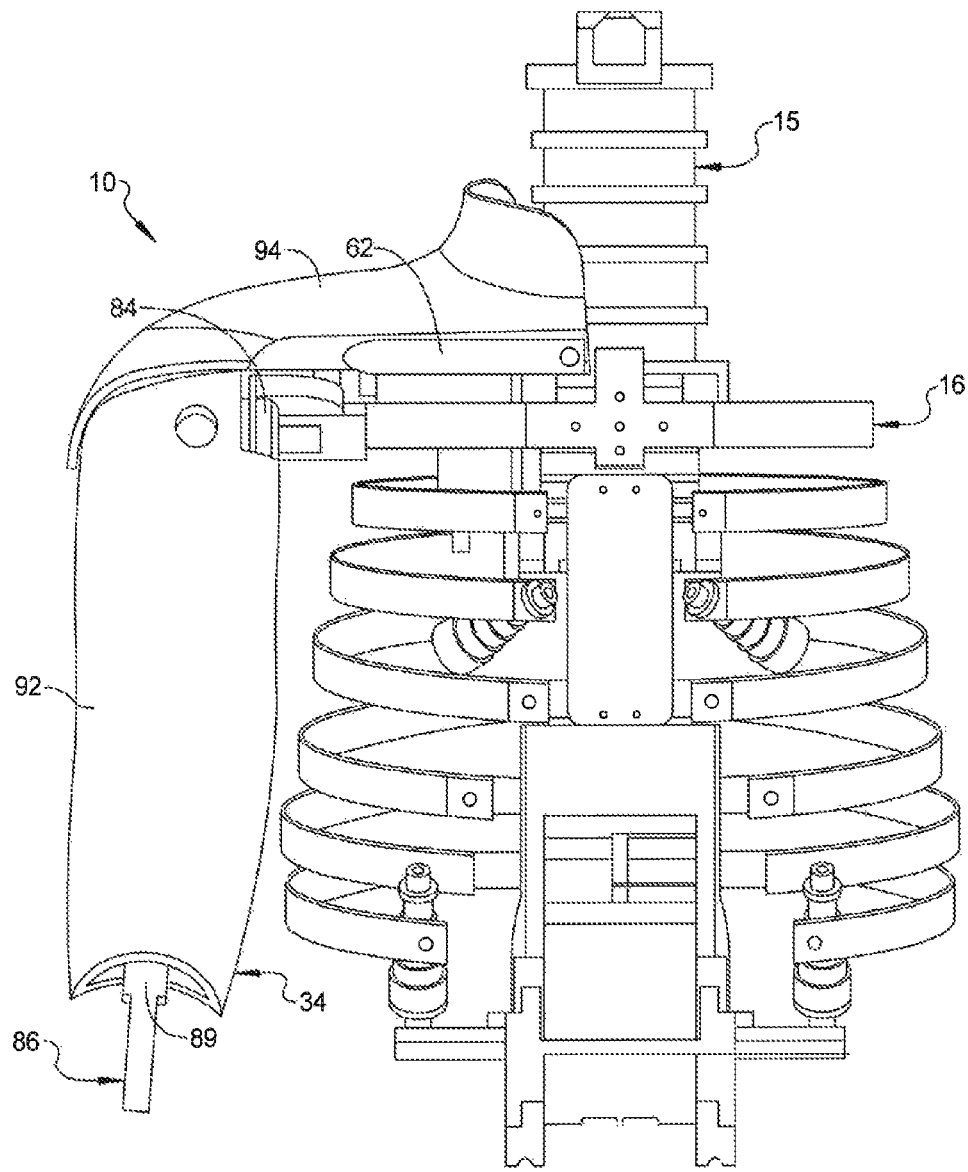
FIG. 4 is a front view of the shoulder and upper arm assembly illustrated in operational relationship with a portion of the crash test dummy of FIG. 1.
Figure 5:
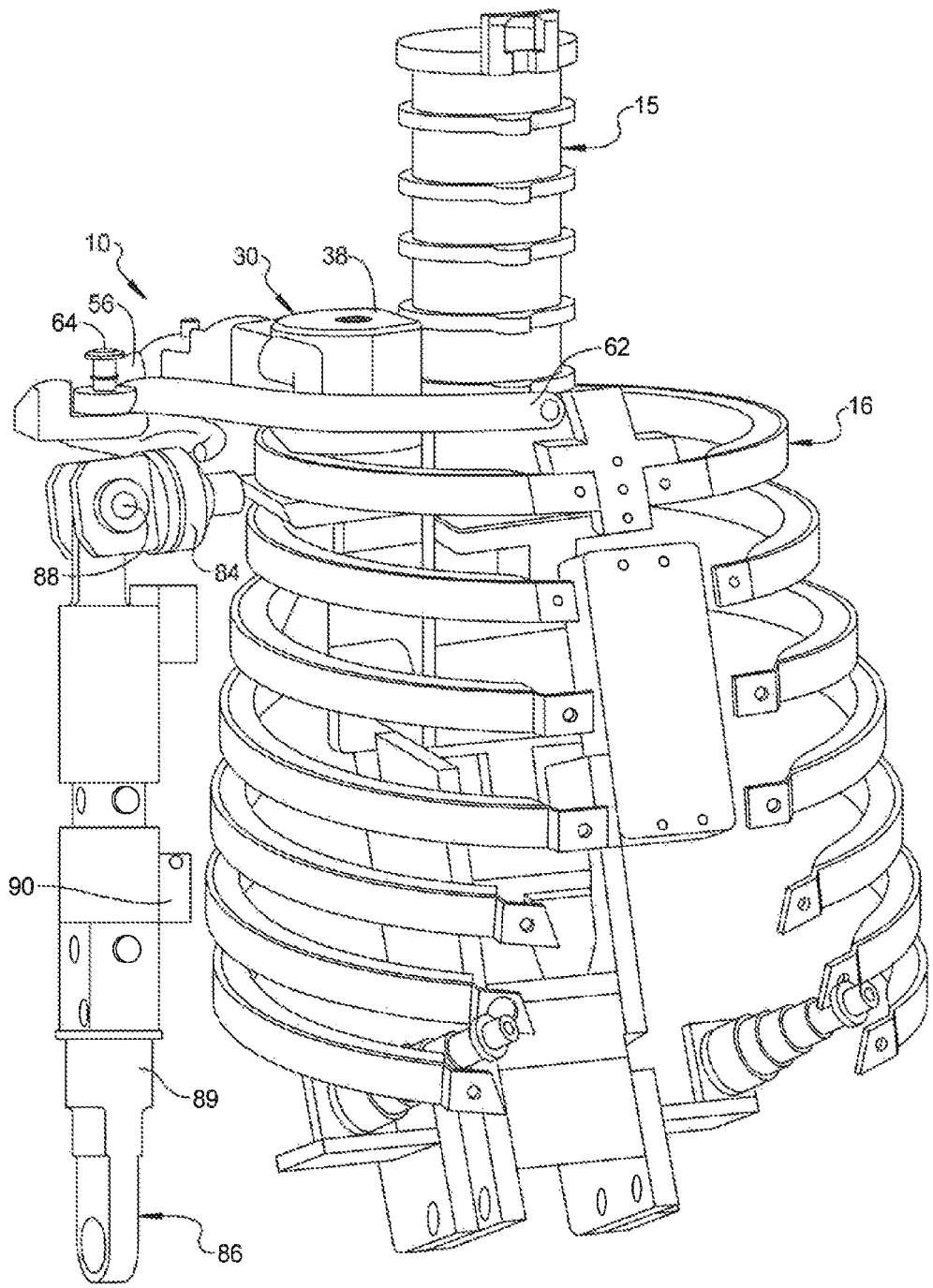
FIG. 5 is a perspective view of the shoulder and upper arm assembly illustrated in operational relationship with a portion of the crash test dummy of FIG. 1 with a shoulder cover and flesh removed.
Figure 6:
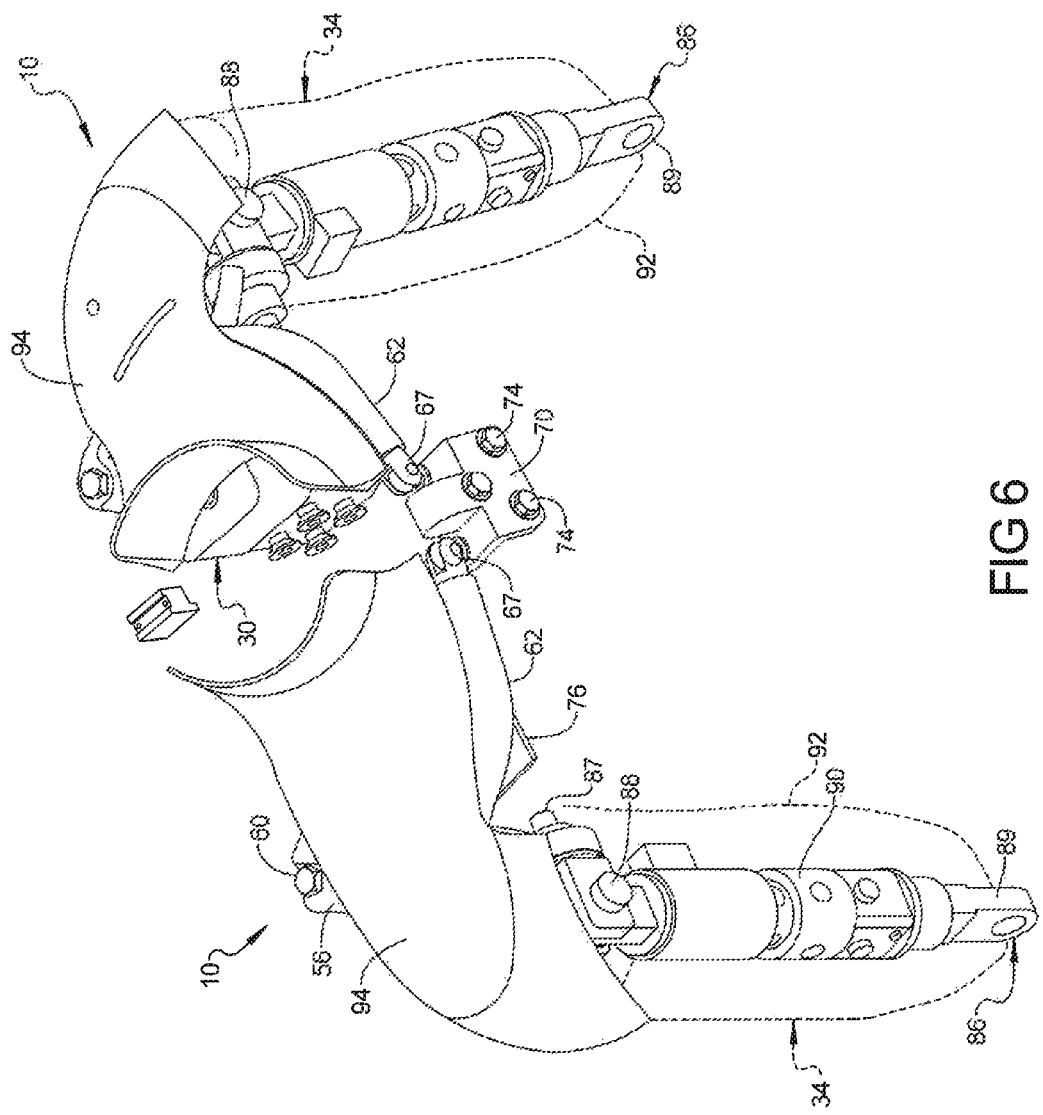
FIG. 6 is a perspective view of the shoulder and upper arm assembly of the crash test dummy of FIG. 1.
Figure 7:
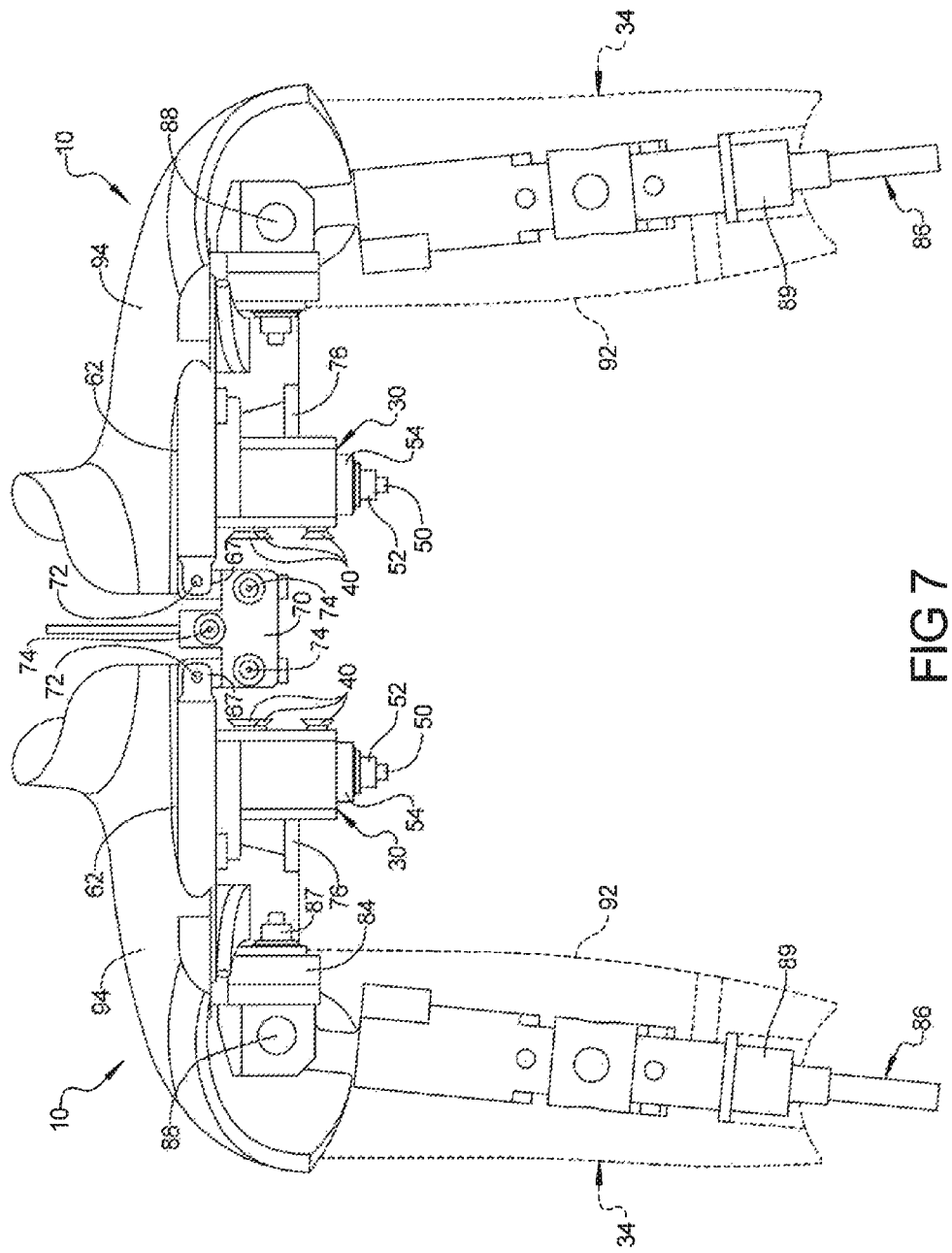
FIG. 7 is a front view of the shoulder and upper arm assembly of the crash test dummy of FIG. 1.
Figure 8:
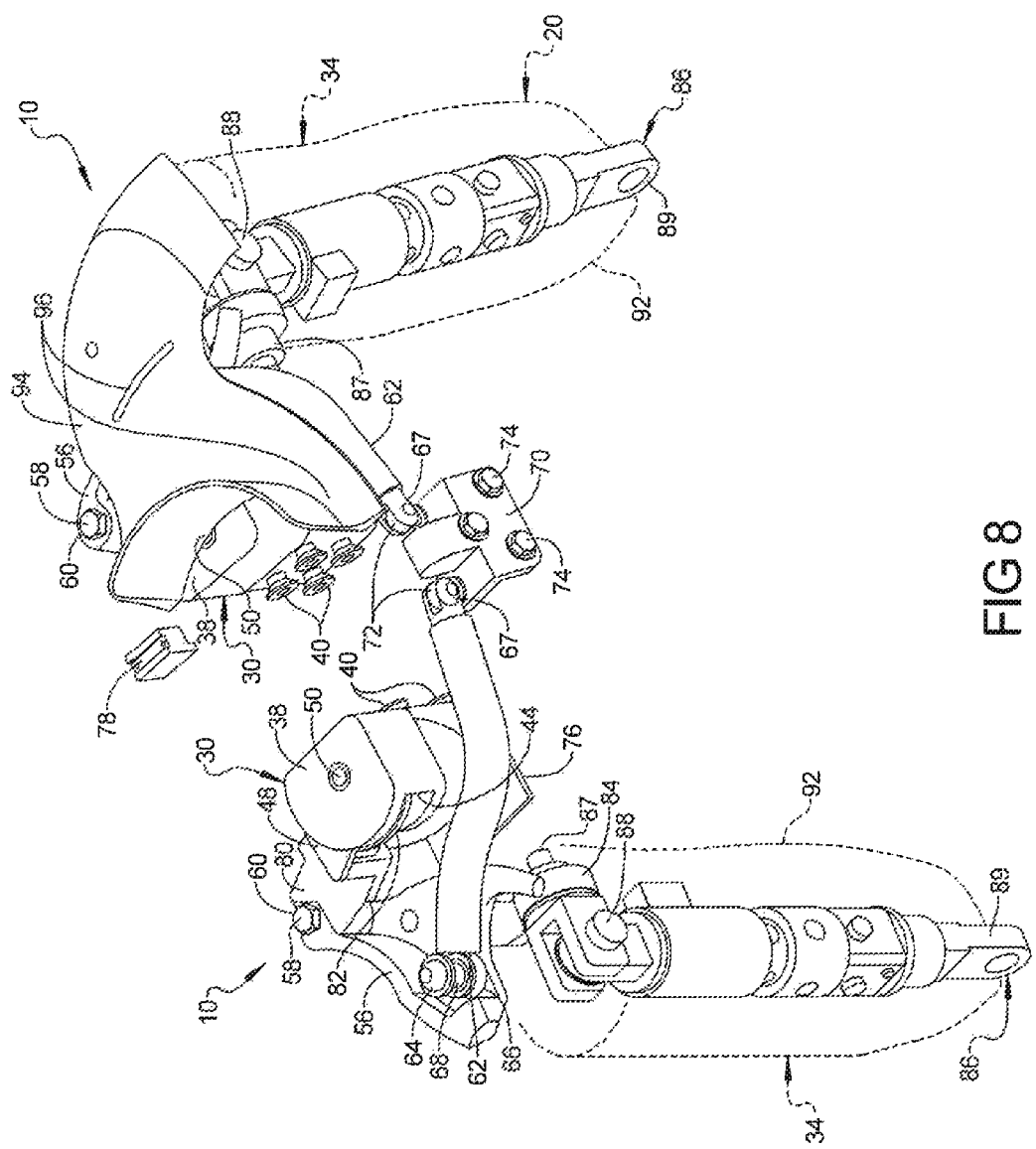
FIG. 8 is a perspective view of the shoulder and upper arm assembly of the crash test dummy of FIG. 1 with one shoulder cover removed.
Figure 9:
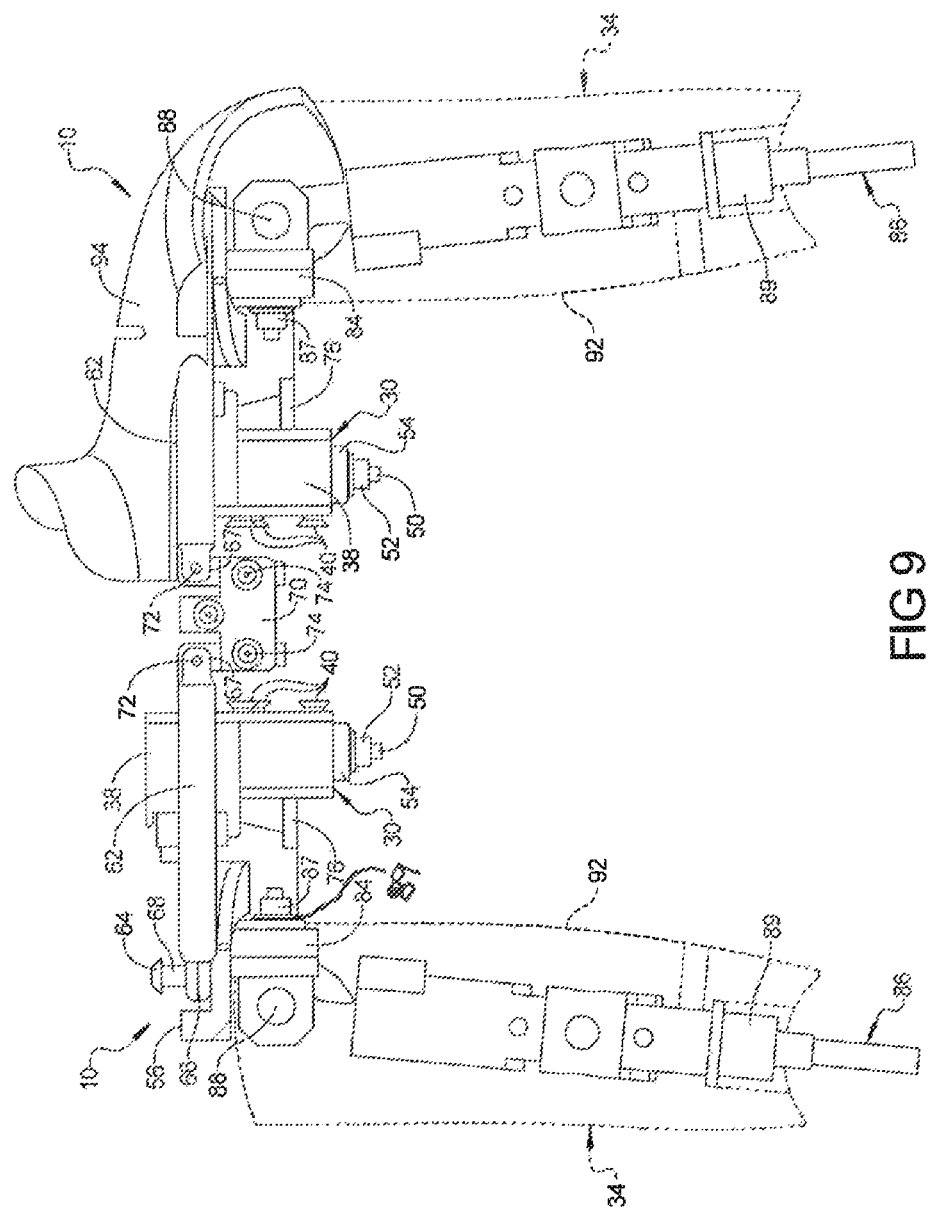
FIG. 9 is a front view of the shoulder and upper arm assembly of the crash test dummy of FIG. 1 with one shoulder cover removed.
Figure 10:
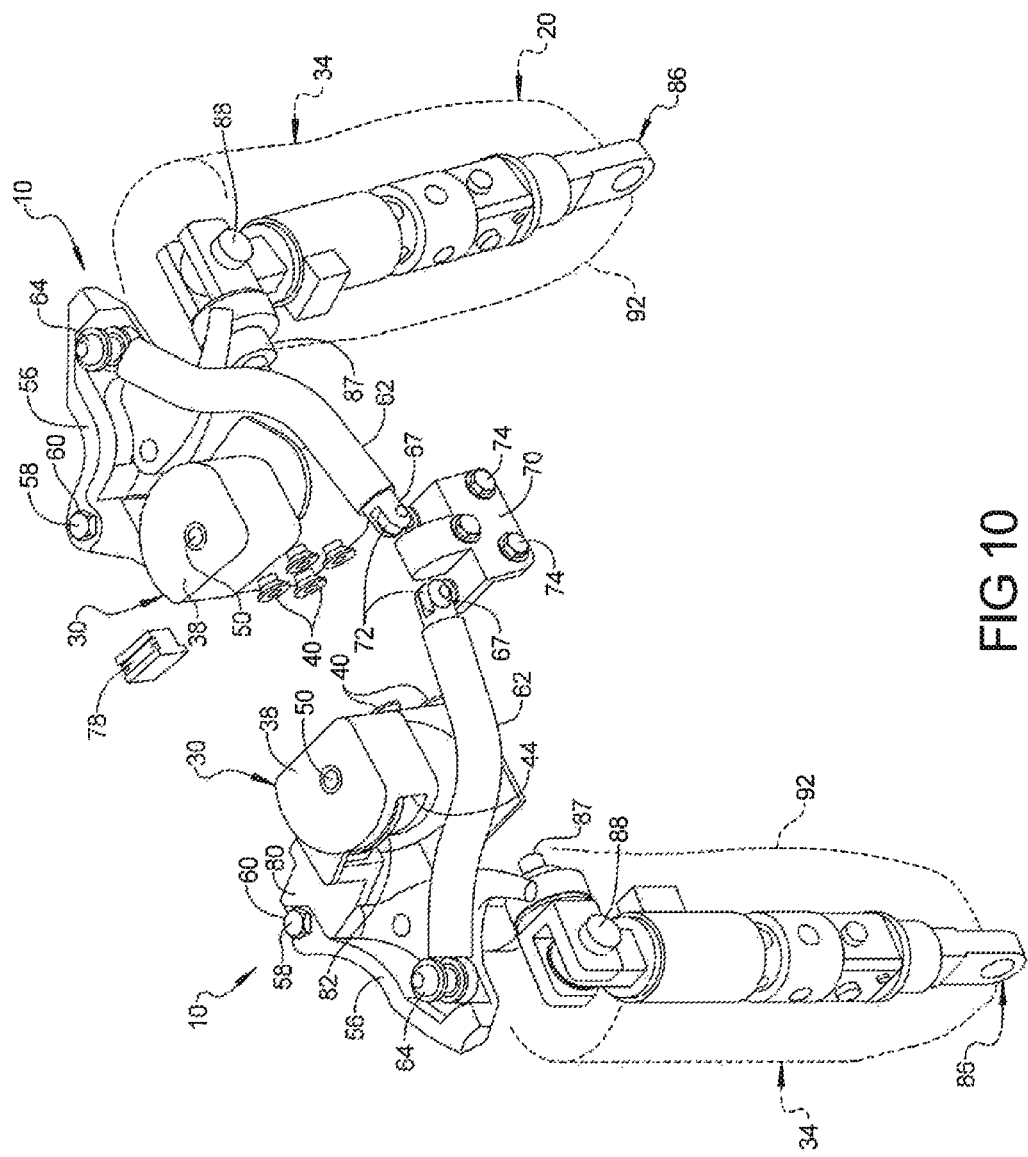
FIG. 10 is a perspective view of the shoulder and upper arm assembly of the crash test dummy of FIG. 1 with both shoulder covers removed.
Figure 11:
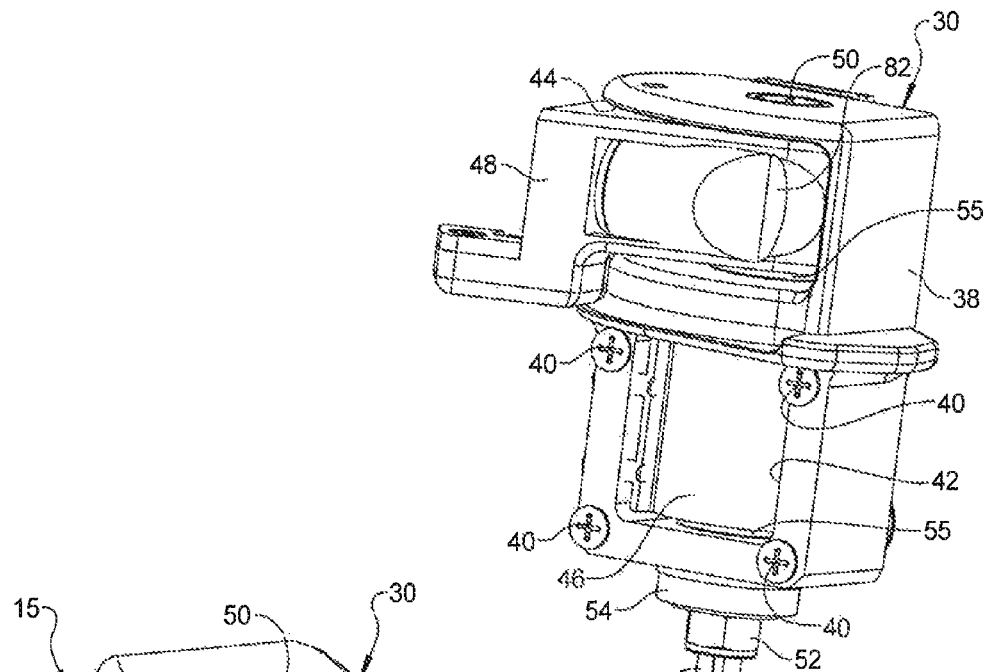
FIG. 11 is a perspective view of a portion of the shoulder assembly of the crash test dummy of FIG. 1.
Figure 12:
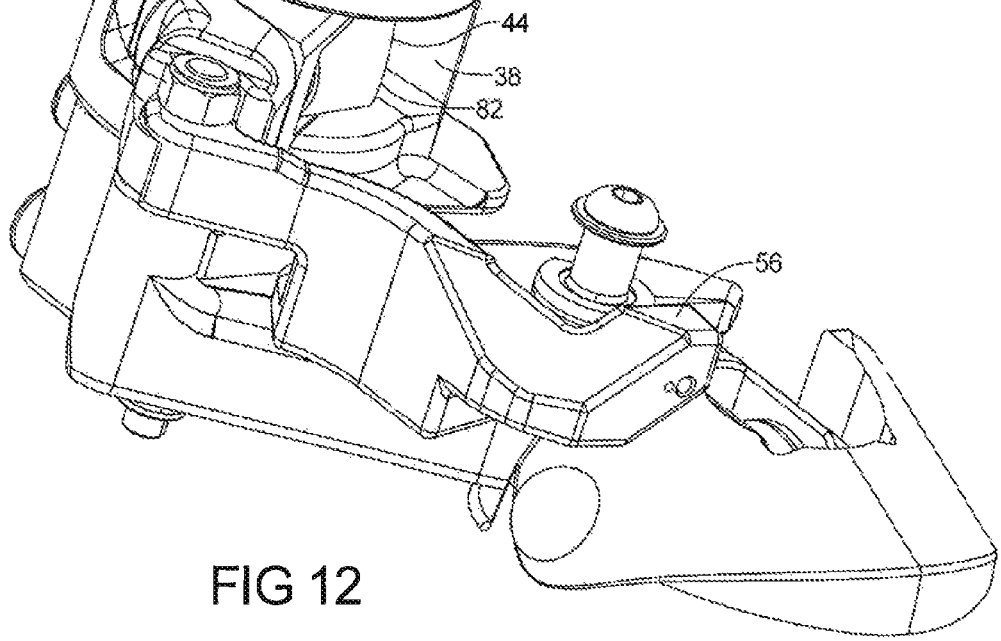
FIG. 12 is a perspective view of a portion of the shoulder assembly of the crash test dummy of FIG. 1.
Figure 11A:
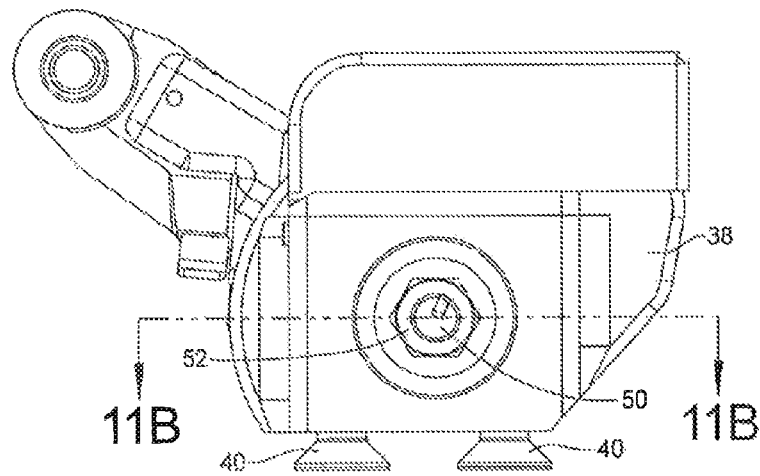
FIG. 11A is a bottom view of the portion of the shoulder assembly of FIG. 11.
Figure 11B:
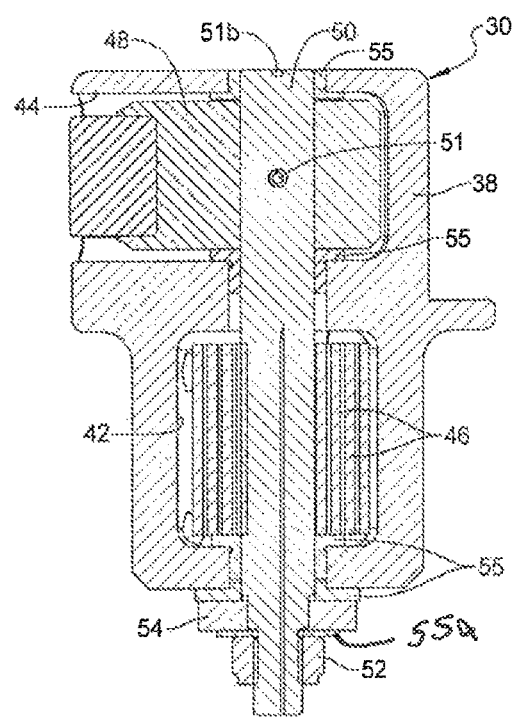
FIG. 11B is a sectional view taken along line 11B-11B of FIG. 11A.
Figure 11C:
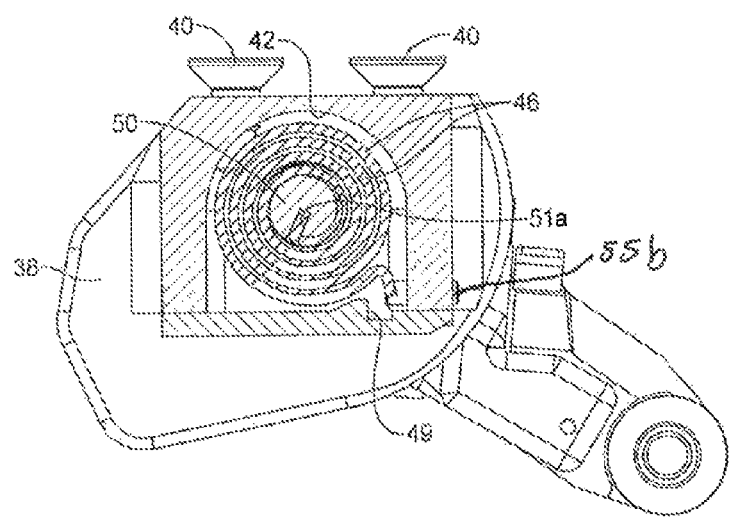
FIG. 11C is a fragmentary view of the portion of the shoulder assembly of FIG. 11.
Figure 14:
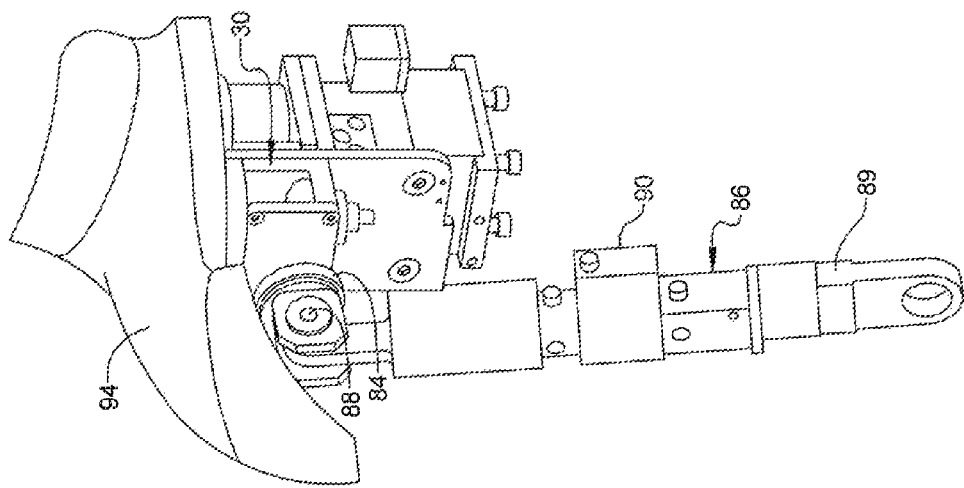
FIG. 14 is a perspective view of a portion of the shoulder and upper arm assembly of the crash test dummy of FIG. 1 with the flesh removed.
Figure 13:
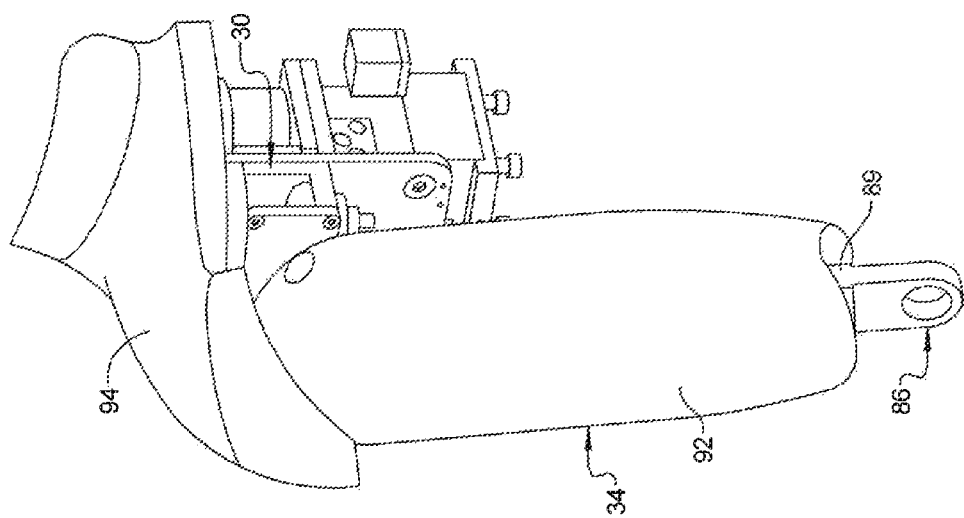
FIG. 13 is a perspective view of a portion of the shoulder and upper arm assembly of the crash test dummy of FIG. 1.

Referring to the drawings and in particular FIGS. 1 and 2, one embodiment of a shoulder and upper arm assembly 10, according to the present invention, is shown in operational relationship with a crash test dummy, generally indicated at 12. The crash test dummy 12 is of a fiftieth percentile (50%) male type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. As illustrated in FIGS. 1 through 5, the crash test dummy 12 also includes a spine assembly, generally indicated at 15, having an upper end mounted to the head assembly 14 and a lower end extending into a torso area of the crash test dummy 12 and connected to a spine mounting weldment (not shown) by an adapter assembly (not shown).

The torso area of the crash test dummy 12 also includes a rib cage assembly, generally indicated at 16, connected to the spine assembly 15. The crash test dummy 12 also has a pair of arm assemblies including a right arm assembly, generally indicated at 18, and a left arm assembly, generally indicated at 20 (FIGS. 6 through 9), which are attached to the crash test dummy 12 via a shoulder assembly, according to one embodiment of the present invention and generally indicated at 30, to be described.

As illustrated in the FIG. 1, a lower end of the spine assembly 15 is connected to a lumbar-thoracic adapter (not shown), which is connected to a lumbar to pelvic adapter (not shown). The crash test dummy 12 includes a pelvis assembly (not shown) connected to the adapter. The crash test dummy 12 includes a right leg assembly 22 and a left leg assembly 26, which are attached to the pelvis assembly. It should be appreciated that various components of the crash test dummy 12 are covered in a polyvinyl skin such as a flesh and skin assembly (partially shown) for biofidelity of the crash test dummy 12.

Referring to FIGS. 2 through 10, the shoulder and upper arm assembly 10, according to one embodiment of the present invention, is shown. The shoulder and upper arm assembly 10 can be used on both the right hand and left hand positions of the crash test dummy 12. In the embodiment illustrated, one shoulder and upper arm assembly 10 is on the right hand position of the crash test dummy 12 and another shoulder and upper arm assembly 10 is on the left hand position of the crash test dummy 12. Since the shoulder and upper arm assembly 10 is symmetric for each of the right hand and left hand positions of the crash test dummy 12, only one of the shoulder and upper arm assembly 10 will be subsequently described. It should be appreciated that the subsequent description of the shoulder and upper arm assembly 10 is the same for both the right hand and left hand positions of the crash test dummy 12.

The shoulder and upper arm assembly 10 includes a shoulder assembly, according to one embodiment of the present invention and generally indicated at 30, connected to the spine assembly 15. The shoulder and upper arm assembly 10 also includes an upper arm assembly, according to one embodiment of the present invention and generally indicated at 34, connected to the shoulder assembly 30. It should be appreciated that the upper arm assembly 34 is also part of the right arm assembly 18 and left arm assembly 20, respectively.

Referring to FIGS. 2 through 14, the shoulder assembly 30 includes a spring housing 38 extending axially and being generally rectangular in shape. The spring housing 38 is connected to the spine assembly 15 by a suitable mechanism such as fasteners 40, for example screws. The spring housing 38 has a hollow interior cavity 42 near one axial end and a recess 44 near the other axial end. The shoulder assembly 30 further includes at least one spring element 46 disposed in the interior cavity 42 of the spring housing 38. The spring element 46 is preferably of a coil, clock, or watch spring type. One end of the spring element 46 is disposed in a slot 49 of the spring housing 38 and the other end of the spring element is disposed in a slot 51a of a shaft 50 to be described.

The shoulder assembly 30 also includes a shoulder pivot member 48 partially disposed in the recess 44 of the spring housing 38. The shoulder pivot member 48 has one end connected to the spring housing 38 by a suitable mechanism such as a shaft 50 extending axially through the spring housing 38, shoulder pivot member 48, and spring element 46. The shoulder pivot member 48 is connected to the shaft 50 via a pin 51. The shaft 50 is generally cylindrical in shape and has a first slot 51a to receive one end of the spring element 46 and a second slot 51b to receive a tool (not shown) such as a screwdriver. The shoulder assembly 30 includes a fastener 52 such as a nut on the threaded end of the shaft 50. It should be appreciated that the shoulder assembly 30 may include a dampening member 54 between the fastener 52 and the spring housing 38. It should also be appreciated that the shoulder assembly 30 may include at least one or more bearings 55 between the shaft 50 and the housing 38 and at least one conical spring washer 55a between the dampening member 54 and the fastener 52.

On assembly, an operator (not shown) adjusts the fastener 52 relative to the shaft 50. The operator uses a tool and rotates the fastener 52 relative to the shaft 50 to apply friction to the shoulder pivot member 48. The fastener 52 is adjusted to apply a constant friction through the conical spring washer 55a to the shoulder pivot member 48. It should be appreciated that the shaft 50 and fastener 52 rotate as a unit and the spring element 46 applies a friction or resistance to the shoulder pivot member 48 via the shaft 50. It should also be appreciated that the joint friction may be adjusted by tightening or loosening the fastener 52. It should further be appreciated that the spring element 46 end play is removed using one or more set screws 55b engaging the spring housing 38.

The shoulder assembly 30 further includes a coracoid and scapula member 56 having one end pivotally connected to the shoulder pivot member 48 by a shaft 58. The shaft 58 may be coated with a bearing material. The shoulder assembly 30 also includes a fastener 60 such as a nut on the end of the shaft 56. It should be appreciated that the coracoid and scapula member 56 pivots relative to the shoulder pivot member 48.

The shoulder assembly 30 includes a clavicle assembly 62 having one end connected to the coracoid and scapula member 56 by a suitable mechanism such as a fastener 64, for example, a bolt. The clavicle assembly 62 includes one or more spherical joints 66 and 67 on the distal end and the proximal end. The shoulder assembly 30 further includes a solid elastomer molding 68 disposed about the fastener 64 and the spherical joint 66 of the clavicle assembly 62.

The shoulder assembly 30 also includes a sternum bracket 70 connected to the joint 67 of the clavicle assembly 62 by a suitable mechanism such as fastener 72. The sternum bracket 70 is also connected to the rib cage assembly 16 by a suitable mechanism such as fasteners 74, for example, screws and washers.

The shoulder assembly 30 also includes a rib shelf 76 integrated into the spring housing 38. The rib shelf 76 has a low friction coating thereon. The shoulder assembly 30 may include a sensor 78 such as an accelerometer mounted to the shoulder assembly 30. The shoulder assembly 30 may include a solid molding 80 disposed on the shoulder pivot member 48 to act as a forward motion stop on the spring housing 38 and a solid molding 82 disposed in a recess of the shoulder pivot member 48 to provide a rearward motion stop on the spring housing 38. The shoulder assembly 30 further includes a humerus joint 84 on the coracoid and scapula member 56. The humerus joint 84 is a two degrees of freedom joint between the humerus and the shoulder. Both axis of the humerus joint 84 have adjustable friction. The lateral axis friction is adjustable with a nut 87 and a conical spring washer 89 and the other axis friction is adjustable with a shoulder bolt member 88 with a sliding nut and bushing assembly which are prevented from rotating relative to the shoulder bolt member 88.

The upper arm assembly 34 includes a bone assembly, generally indicated at 86, extending axially and having one end connected to the humerus joint 84 by a suitable mechanism such as a shoulder bolt member 88. The bone assembly 86 also has another end for connection to a lower arm assembly. The bone assembly 84 includes a metal bone 89 extending axially and may include an arm load cell 90 attached to the metal bone 89 by a suitable mechanism such as fasteners to measure a load on the upper arm assembly 34. The upper arm assembly 34 further includes a flesh 92 extended around the bone assembly 86 and the humerus joint 84.

The shoulder and upper arm assembly 10 further includes a shoulder cover 94 to cover the shoulder assembly 30. The shoulder cover 94 is disposed over the top of the shoulder assembly 30. The shoulder cover 94 attaches to the shoulder assembly 30 using the fastener 64 that also passes through and attaches the exterior end of the joint 66. The shoulder and upper arm assembly 10 also includes at least one, preferably a plurality of tie wraps 96 to tie the interior part of the shoulder cover 94 to the clavicle assembly 62. It should be appreciated that the shoulder and upper arm assembly 10 may include a clavicle load cell located adjacent the spherical joints 66 and 67 that allows measurement of vertical and interior-posterior loads in both ends of the clavicle assembly 62. It should be appreciated that the shoulder cover 94 may be a right hand shoulder cover 94 or a left hand shoulder cover 94.

Accordingly, the shoulder and upper arm assembly 10 of the present invention allows a complex and large range of shoulder motion. The shoulder and upper arm assembly 10 of the present invention provides a repeatable position of and interaction with a restraint belt. The shoulder and upper arm assembly 10 of the present invention includes a spherical joint for the clavicle assembly 62, introduction of adjustable joint friction to obtain a more reproducible dummy seating position, and geometric simplification of components for ease of manufacturing, etc.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A shoulder assembly for a crash test dummy comprising:
    a spring housing adapted to be connected to a spine assembly of the crash test dummy and having a hollow interior cavity;
    a shoulder pivot member pivotally connected to said spring housing;
    a rotatable shaft extending axially through said spring housing;
    a spring element disposed in said interior cavity of said spring housing, said spring element being disposed about said rotatable shaft and having one end coupled to said shaft and another end coupled to said spring housing; and
    an adjustable member disposed about said rotatable shaft and rotatable thereto to adjust a friction of said said shoulder pivot member.

2. A shoulder assembly as set forth in claim 1 for a crash test dummy comprising:
    a spring housing adapted to be connected to a spine assembly of the crash test dummy and having a hollow interior cavity;
    a shoulder pivot member pivotally connected to said spring housing;
    a rotatable shaft extending axially through said spring housing;
    a spring element disposed in said interior cavity of said spring housing and having one end coupled to said shaft and another end coupled to said spring housing;
    an adjustable member disposed about said rotatable shaft and rotatable thereto to adjust a friction of said shoulder pivot member; and
    wherein said adjustable member comprises a rotatable fastener on an end of said shaft to apply an adjustable joint friction with said spring element.

3. A shoulder assembly as set forth in claim 2 including a dampening member disposed between said fastener and said spring housing.

4. A shoulder assembly as set forth in claim 1 including a solid molding disposed on said shoulder pivot member to act as a forward motion stop on said spring housing.

5. A shoulder assembly as set forth in claim 1 including a solid molding disposed in a recess of said shoulder pivot member to provide a rearward motion stop on said spring housing.

6. A shoulder assembly for a crash test dummy comprising:
   a spring housing;
   a shoulder pivot member pivotally connected to said spring housing;
   a rotatable shaft extending axially through said spring housing;
   a spring element disposed in said spring housing and coupled to said rotatable shaft;
   an adjustable member disposed about said rotatable shaft and rotatable thereto to adjust a friction of said shoulder pivot member; and
   wherein said spring housing has a hollow interior cavity near one axial end and a recess near the other axial end, said spring element being disposed in said interior cavity of said spring housing.

7. A shoulder assembly for a crash test dummy comprising:
   a spring housing;
   a shoulder pivot member pivotally connected to said spring housing;
   a spring element disposed in said spring housing;
   an adjustable member disposed about said rotatable shaft and rotatable thereto to adjust a friction of said shoulder pivot member; and
   a plurality of washers, one of said washers being disposed between said shoulder pivot member and said spring housing and another one of said washers being disposed between said spring element and said spring housing.

8. A shoulder assembly for a crash test dummy comprising:
   a spring housing;
   a shoulder pivot member pivotally connected to said spring housing;
   a rotatable shaft extending axially through said spring housing;
   a spring element disposed in said spring housing and coupled to said rotatable shaft;
   an adjustable member disposed about said rotatable shaft and rotatable thereto to adjust a friction of said shoulder pivot member; and
   wherein said spring element is one of a coil, clock, and watch spring type.

9. A shoulder assembly for a crash test dummy comprising:
   a spring housing;
   a shoulder pivot member pivotally connected to said spring housing;
   a rotatable shaft extending axially through said spring housing;
   a spring element disposed in said spring housing and coupled to said rotatable shaft;
   an adjustable member disposed about said rotatable shaft and rotatable thereto to adjust a friction of said shoulder pivot member; and
   a coracoid and scapula member having one end pivotally connected to said shoulder pivot member.

10. A shoulder assembly as set forth in claim 9 including a humerus joint disposed on said coracoid and scapula member and having two axes of freedom.

11. A shoulder assembly as set forth in claim 10 including an adjustable mechanism for adjusting friction of at least one of said axes of said humerus joint.

12. A shoulder assembly as set forth in claim 11 wherein said adjustable mechanism comprises a nut to adjust friction of one of said axes.

13. A shoulder assembly as set forth in claim 12 wherein said adjustable mechanism comprises a shoulder bolt member to adjust friction of the other of said axes.

14. A shoulder assembly as set forth in claim 9 including a clavicle assembly having one end connected to said coracoid and scapula member.

15. A shoulder assembly as set forth in claim 14 wherein said clavicle assembly includes a spherical joint on a distal end and on a proximal end thereof.

16. A shoulder assembly for a crash test dummy comprising:
   a spring housing;
   a shoulder pivot member pivotally connected to said spring housing;
   a rotatable shaft extending axially through said spring housing;
   a spring element disposed in said spring housing;
   an adjustable member disposed about said rotatable shaft;
   a coracoid and scapula member having one end pivotally connected to said shoulder pivot member;
   a clavicle assembly having one end connected to said coracoid and scapula member, said clavicle assembly including a spherical joint on a distal end and on a proximal end thereof; and
   a solid elastomer molding disposed about said spherical joint of said clavicle assembly.

17. A crash test dummy comprising:
   a body;
   a spine assembly operatively attached to said body; and
   a shoulder assembly operatively attached to said spine assembly and comprising a spring housing having a hollow interior cavity, a shoulder pivot member pivotally connected to said spring housing, a rotatable shaft extending axially through said spring housing, a spring element disposed in said interior cavity of said spring housing and having one end coupled to said shaft and another end coupled to said spring housing, and an adjustable member disposed about said rotatable shaft and rotatable thereto to adjust a friction of said shoulder pivot member.

18. A crash test dummy as set forth in claim 17 wherein said spring element is one of a coil, clock, and watch spring type.

19. A crash test dummy comprising:
   a body;
   a spine assembly operatively attached to said body;
   a shoulder assembly operatively attached to said spine assembly and comprising a spring housing having a hollow interior cavity, a shoulder pivot member pivotally connected to said spring housing, a rotatable shaft extending axially through said spring housing, a spring element disposed in said interior cavity of said spring housing and having one end coupled to said shaft and another end coupled to said spring housing, and an adjustable member disposed about said rotatable shaft and rotatable thereto to adjust a friction of said shoulder pivot member; and wherein said adjustable member comprises a rotatable fastener on an end of said shaft to apply an adjustable joint friction with said spring element.

20. A crash test dummy comprising:

a body;

a spine assembly operatively attached to said body;

a shoulder assembly operatively attached to said spine assembly and comprising a spring housing having a hollow interior cavity, a shoulder pivot member pivotally connected to said spring housing, a rotatable shaft extending axially through said spring housing, a spring element disposed in said interior cavity of said spring housing and having one end coupled to said shaft and another end coupled to said spring housing, and an adjustable member disposed about said rotatable shaft and rotatable thereto to adjust a friction of said shoulder pivot member; and wherein said shoulder assembly includes a dampening member disposed between said adjustable member and said spring housing.

21. A crash test dummy comprising:

a body;

a spine assembly operatively attached to said body;

a shoulder assembly operatively attached to said spine assembly and comprising a spring housing, a shoulder pivot member pivotally connected to said spring housing, a rotatable shaft extending axially through said spring housing, a spring element disposed in said spring housing and coupled to said rotatable shaft, and an adjustable member disposed about said rotatable shaft and rotatable thereto to adjust a friction of said shoulder pivot member; and wherein said shoulder assembly includes a friction washer disposed between said shoulder pivot member and said spring housing and between said spring element and said spring housing.

22. A crash test dummy comprising:

a body;

a spine assembly operatively attached to said body;

a shoulder assembly operatively attached to said spine assembly and comprising a spring housing, a shoulder pivot member pivotally connected to said spring housing, a rotatable shaft extending axially through said spring housing, a spring element disposed in said spring housing and coupled to said rotatable shaft, and an adjustable member disposed about said rotatable shaft and rotatable thereto to adjust a friction of said shoulder pivot member; and wherein said shoulder assembly includes a solid molding disposed on said shoulder pivot member to act as a forward motion stop on said spring housing.

23. A crash test dummy comprising:

a body;

a spine assembly operatively attached to said body;

a shoulder assembly operatively attached to said spine assembly and comprising a spring housing, a shoulder pivot member pivotally connected to said spring housing, a rotatable shaft extending axially through said spring housing, a spring element disposed in said spring housing and coupled to said rotatable shaft, and an adjustable member disposed about said rotatable shaft and rotatable thereto to adjust a friction of said shoulder pivot member; and wherein said shoulder assembly includes a solid molding disposed in a recess of said shoulder pivot member to provide a rearward motion stop on said spring housing.

* * * * *

UNITED STATES PATENT AND TRADEMARK OFFICE
CERTIFICATE OF CORRECTION

PATENT NO. : 9,799,234 B2
APPLICATION NO. : 14/148927
DATED : October 24, 2017
INVENTOR(S) : Bernard Willem Been et al.

It is certified that error appears in the above-identified patent and that said Letters Patent is hereby corrected as shown below:

In the Claims

At Column 6, Line number 45, Claim 1, delete "to adjust a friction of said said shoulder pivot member" replace with -- to adjust a friction of said shoulder pivot member --

Signed and Sealed this
Twenty-ninth Day of May, 2018

Andrei Iancu
*Director of the United States Patent and Trademark Office*